(No Model.) 2 Sheets—Sheet 2.

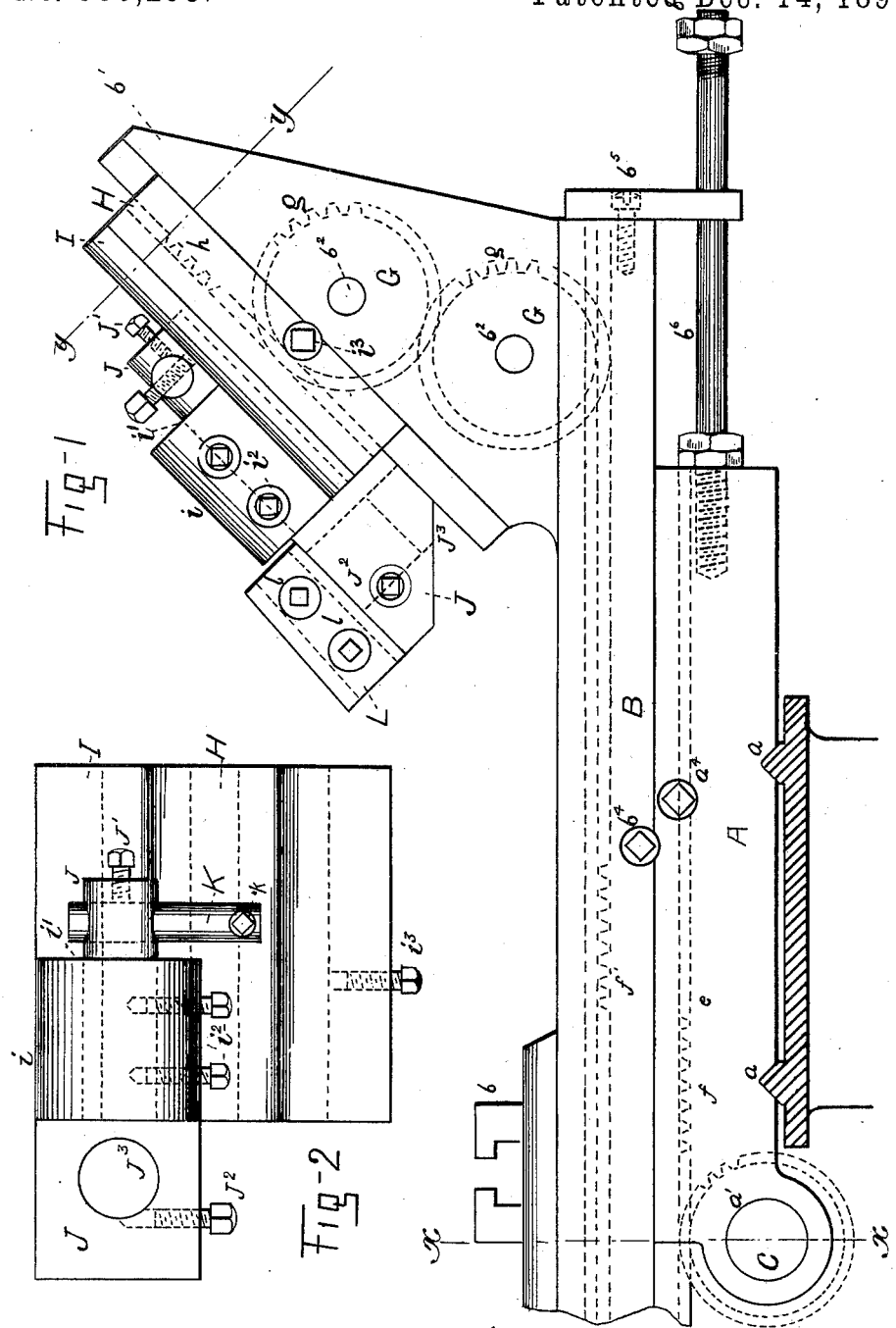

W. L. CHENEY & W. B. COMSTOCK.
LATHE SLIDE.

No. 595,288. Patented Dec. 14, 1897.

WITNESSES:
Jas. R. Coe
C. R. Ayres

INVENTORS
Walter L. Cheney
Wm. B. Comstock
BY Geo. L. Cooper
ATTORNEY.

UNITED STATES PATENT OFFICE.

WALTER LEE CHENEY AND WILLIAM BROWN COMSTOCK, OF MERIDEN, CONNECTICUT.

LATHE-SLIDE.

SPECIFICATION forming part of Letters Patent No. 595,288, dated December 14, 1897.

Application filed March 18, 1897. Serial No. 628,142. (No model.)

*To all whom it may concern:*

Be it known that we, WALTER LEE CHENEY and WILLIAM BROWN COMSTOCK, citizens of the United States, residing at Meriden, New Haven county, Connecticut, have invented a new and useful Improvement in Lathe-Slides, of which the following is a specification.

Our invention has for its object to combine the advantages of the ordinary "undercut" slide and of the "upright" forming-slide. In our construction both slides may be used on the same piece of work, both may be simultaneously withdrawn to permit the action of turret-tools, or either may be separately used.

Figure 4:
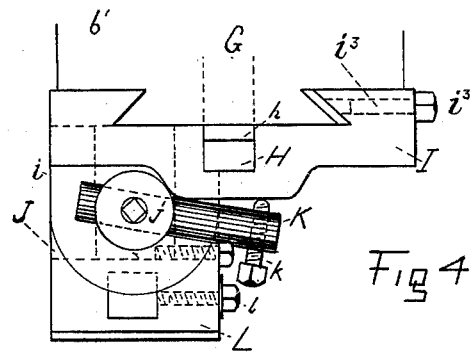
Figure 3:
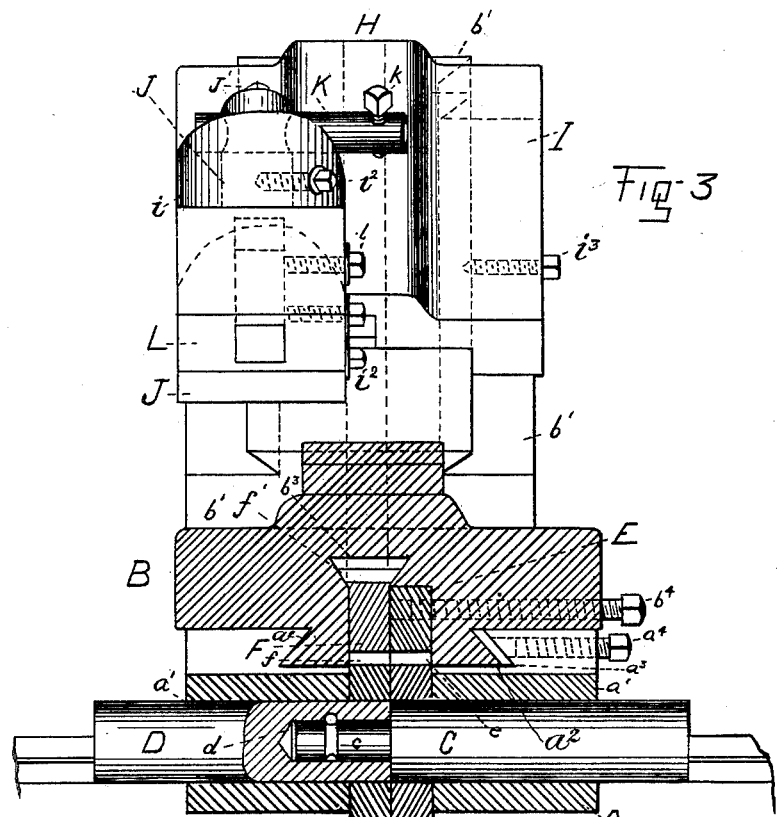

In the accompanying drawings, Figure 1 represents our device in elevation. Fig. 2 is a top view of a portion of our device detached from the rest. Fig. 3 is a cross-section of our device on the line $x\,x$, Fig. 1. Fig. 4 is a cross-section on the line $y\,y$, Fig. 1, looking forward and downward.

The same letters refer to like parts in the several views.

A designates a cross-slide body having ordinary guides $a$ for the latheways; $a'\,a'$, shaft-bearings; $a^2$, a channeled guide; $a^3$, a gib; $a^4$, a set-screw; B, a movable slide; $b$, an ordinary tool-post holder; $b'$, a slide-bed; $b^2\,b^2$, bearings for pinion-shafts; $b^3$, a channeled guide; $b^4$, a set-screw; $b^5$, a stop; $b^6$, a set-screw; $b^7$, a nut; C, a shaft; $c$, a reduced portion of the shaft C; $c'$, a pinion on the shaft C; D, a second shaft having an axial opening $d$ at its inner end and bearing a pinion $d'$; E, a rack on the lower side of the slide B, having teeth $e$; F, a rack capable of longitudinal motion within the slide B and provided with teeth $f$ on its lower surface and teeth $f'$ on its upper surface; G G, pinions whose teeth $g\,g$ intermesh; H, a rack having teeth $h$; I, a forming-slide; $i$, a raised portion of the slide I, bored out at $i'$ and provided with set-screws $i^2\,i^2$; $i^3$, a set screw on the body of the slide I; J, a primary tool-post holder having a cylindric shank $j$, set-screws $j'$ and $j^2$, and bearing $j^3$; K, a stud provided with set-screw $k$; L, a tool-holder provided with set-screws $l\,l$.

In the example of our invention illustrated in the drawings the cross-slide body A is capable of movement longitudinally of the lathe upon its guides $a$ in the usual manner. At its front end it is provided with bearings $a'\,a'$ for the shafts C and D, respectively. A channeled guide $a^2$ is provided for the reception of the movable slide B, the motion of which is controlled by a gib $a^3$ and a set-screw $a^4$. As shown, this and other set-screws bearing against beveled or curved surfaces are provided at their inner ends with shoes. (Not lettered in the drawings.)

The movable slide B carries at its front end a tool-post holder $b$ of ordinary or desired construction. At its rear end it has a bed or support $b'$, whose face is set at an angle preferably of forty-five degrees, more or less. Preferably within the bed $b'$ are formed bearings $b^2\,b^2$ for the shafts of the pinions G G, the uses of which will hereinafter appear. A way or guide $b^3$ is channeled longitudinally through the body of the slide B and serves to receive the sliding rack F, which can be fixed in position by a set-screw $b^4$. A stop $b^5$, running on a set-screw or bolt $b^6$, at the end of which is a nut $b^7$, serves to limit the longitudinal motion of the slide B. The shaft C enters the bearing $a'$ in the front of the slide A and, as shown, is provided with a reduced portion $c$, adapted to coact with a recess $d$ in the shaft D. It will be seen that the shafts C and D abut at their inner ends and that the parts $c$ and $d$ serve only to prevent longitudinal motion of either shaft, while permitting the free rotation of each. At the inner ends of the shafts C and D are pinions $c'$ and $d'$, respectively. The pinion $c'$ engages with a fixed rack E, secured to or forming part of the movable slide B. The pinion $d'$ meshes with the teeth $f$ of the sliding rack F, the teeth $f'$ of which engage with the teeth of the lower pinion G. By means of the two pinions G G motion is transmitted to the rack H on the forming-slide I. The slide I is secured in the usual manner and so as to be capable of longitudinal motion to the inclined surface of the bed $b'$. As shown, it has a raised portion $i$, bored at $i'$ to receive the cylindric shank $j$ of the primary tool-post holder J. Two set-screws $i^2\,i^2$ serve to secure the shank $j$, while the forming-slide I may itself be locked on the bed $b'$ by a set-screw $i^3$. Preferably at the rear of the shank $j$ on the holder J is a set-screw $j'$, acting to retain in position a stud K. In the body of the holder J (shown as planed off on its upper surface) is a bearing $j^3$, adapted to receive the cylindric shank of a tool-holder L and provided with a set-screw $j^2$. The stud K projects radially from the shank $j$ of the holder J and has a set-screw $k$. The tool-holder L, which bears upon the upper surface of the primary holder J, has two screws for securing the tool. (Not shown in the drawings.)

The operation of our device will be readily understood from an inspection of the drawings.

The shafts C and D are capable of rotary and secured against longitudinal motion in the front end of the cross-slide A. Ordinary hand wheels or levers (not shown in the drawings) are attached to the outer free ends of the shafts C and D in the usual manner. It will first be noted that for the operation of boring or the like the movable slide B may be locked to the cross-slide A by means of the set-screw $a^4$. A tool-post and tool may then be inserted in the holder $b$ and the slide moved longitudinally of the lathe in any well-known manner, as by a screw-feed. (Not shown.) Releasing the set-screw $a^4$ the tool in the holder $b$ may be used for turning or the like, being cross-fed to the work by a motion of the slide B on the slide A, communicated by means of the shaft C, pinion $c'$, and rack E on the lower side of the movable slide B. If desired, the set-screw $b^4$ may be tightened and the shaft D and rack I may be used to move the slide B. The motion of the slide B may be limited by the stop $b^5$ acting in connection with the set-screw or bolt $b^6$ and nut $b^7$. When it is desired to get such a cut or operation as is ordinarily produced by an upright lathe, the set-screw $b^4$ is loosened and the forming-slide I brought into play by means of the shaft D, pinion $d'$, rack F, pinions G G, and rack H. In this way the forming-slide I may be moved forward and downward on the inclined bed $b'$ of the slide B. Through the raised portion $i$ of the slide I passes the shank of a primary tool-holder J. This shank $j$ is preferably made cylindric to permit a wide and easy variation in the set of the tool in the holder L. Proper set-screws $i^2$ $i^2$ firmly hold the shank $j$ of the holder J. A set-screw $j^4$ holds the shank, also preferably cylindric, of the tool-holder L, and set-screws $l\,l$ are adapted to secure the tool (not shown) in the holder L. To secure the more exact adjustment of the shaft $j$ of the primary holder J, we may bore it crosswise and insert a stud K, held in position by a set-screw $j'$. Through the free end of the stud K projects a set-screw $k$, the point of which bears on the top or face of the forming-slide I. By this means a delicate axial motion may be given the holder J before it is locked by the screws $i^2$ $i^2$.

It will be seen that our invention combines in one the advantages of both undercut and upright slides; that in addition to all the work that can be done on the former it permits the dropping of the large diameter of work, the chips out of danger of scratching the work, and the use of a double forming-tool. In addition, our device provides a more convenient mode than heretofore offered of moving the rear tool, a wide range of movement, and the ability to use two independent tools—i. e., front and rear cut—conveniently and successively.

It will be understood that many mechanical alterations may be made in our device without departing from the spirit of our invention—e. g., the fixed rack E and shaft C might be omitted without interfering with the action of the forming-slide I, the pitch of the slide I may be changed from that shown in the drawings, several of the set-screws and stops shown might for cheapness be omitted, or other changes may be made.

What we claim is—

1. In a lathe in combination, a cross-slide, means at the front end of said slide for securing a tool-post, an inclined bed at the rear end of said cross-slide, a forming-slide adapted to forward-and-downward movement on said bed and means substantially as described to produce such motion of said forming-slide.

2. In a lathe-slide in combination a cross-slide, an inclined bed on said cross-slide, a forming-slide adapted to forward-and-downward movement on said bed and means as racks in said cross-slide and said forming-slide, pinions meshing therewith and a shaft at the front end of said cross-slide whereby an operator is enabled to produce such motion of said forming-slide, substantially as described.

3. In a lathe-slide in combination a cross-slide, means as a fixed rack on said cross-slide and a shaft and pinion meshing therewith to move said cross-slide, a forming-slide adapted to forward-and-downward movement on an inclined bed on said cross-slide and means as a rack on said forming-slide, a loose rack in said cross-slide, pinions meshing with said racks and a shaft whereby said forming-slide may be moved independently of said cross-slide, substantially as described.

4. In a lathe forming-slide in combination a slide-body, a tool-post holder provided with a shank adapted to rotary motion in said body, a cross-stud in the free end of said shank and a set-screw in the free end of said stud and bearing on said body, substantially as described.

WALTER LEE CHENEY.
WILLIAM BROWN COMSTOCK.

Witnesses:
IRVING I. GARDNER,
CORNELIUS A. COMSTOCK.